121,397

UNITED STATES PATENT OFFICE.

GEORGE H. MOORE, OF NORWICH, CONNECTICUT.

IMPROVEMENT IN COMPOSITION FOR PAVEMENTS, &c.

Specification forming part of Letters Patent No. 121,397, dated November 28, 1871.

*To all whom it may concern:*

Be it known that I, GEORGE H. MOORE, of Norwich, in the county of New London and State of Connecticut, have invented a new and useful Improved Composition for Pavements, Pipes, Tiles, &c., and I do hereby declare that the following is a description sufficient to enable others versed in the art to make and use the same.

This invention consists essentially in combining and intermingling crushed or powdered steatite or its equivalent, by preference, with cement and sand, sufficient water being added to render the mass plastic, and the powdered steatite may, without departing from the nature and spirit of the invention, be combined and incorporated with any of the ordinary ingredients now employed in forming blocks for pavements, tiles, pipes, figures, &c., or for forming and fashioning any article that the plastic mass may be found adapted to. It also consists in combining and incorporating with crushed or powdered steatite a coloring compound, which two are thoroughly mixed together before the same are incoporated with the ingredients to form the body of the block, tile, figure, or article. In carrying out my invention, when it is designed to form a block, tile, pipe, figure, or other article, when the plastic mass employed is to be of or about two inches in thickness, I take of a composition produced from the following ingredients in or about the proportions specified, viz: Common or Portland cement, about two parts by measure; sand, about two parts by measure; powdered steatite, about one-third part by measure. These ingredients are then thoroughly mixed in any suitable manner and by any desirable means, a sufficient quantity of water being added so as to render the entire mass plastic or susceptible of being formed, molded or fashioned into any desired shape or block, tile, pipe, figure or article sought to be produced. Coloring material, mixed with about one-eighth part of powdered steatite, will be, in some instances, incorporated together in a dry state, and then added to the other ingredients when sufficient water is applied to render the whole mass plastic. When the plastic composition used will be of greater thickness than two inches, I prefer to form the major portion of the block, tile, pipe, figure or article of a composition composed of the following component parts or ingredients, viz: Common or Portland cement, one part by measure; sand, one part by measure; gravel or crushed stone, three parts by measure; powdered steatite or its equivalent, one-half part by measure. These are all thoroughly incorporated or mixed together in any convenient manner and by any desired means, water being added in sufficient quantity to render the mass plastic and ready to be molded or fashioned into regularly or irregularly-shaped blocks, tile, pipes, figure or article. Other ingredients may be substituted in lieu of the cement, sand, and gravel, and the proportions of all may be increased or diminished without departing from the spirit of my invention so long as the crushed or powdered steatite is employed, as it is the essential characteristic feature of my invention, and to which I lay special claim.

I propose to form a block, tile, pipe, figure or article with the coarser composition, which I term "No. 2," that is, from common or Portland cement, sand, gravel, and crushed or powdered steatite and water, and surround it on all or either side, or simply face any portion with the finer composition, likewise termed No. 1—that is, the composition composed of common or Portland cement, sand, powdered steatite and water, with or without a coloring material. When I face or surround the plastic mass formed from the coarse composition with the finer composition I, for economy, dispense with a coloring material in the body thus surrounded. The plastic composition employed for facing or surrounding the coarser block, figure or article will be about one inch in thickness, but such may be varied and governed by the discretion of the manufacturer for the different purposes and uses for which the work is intended. Blocks for pavements, tiles, figures and articles produced from crushed or powdered steatite combined with the ingredients above mentioned, or others similar in nature, render the plastic composition tenacious and easy to manipulate, and the mass will at once assume any form desired by filling snugly all portions of the former or mold employed. After the plastic material has set or become hard, it will be to a great extent non-absorbent, and being almost non-porous it will be impervious to water, and a smooth surface produced without the difficulties of extra labor. The block, tile, figure or article produced will be compact and close-grained. It is evident that while either of the compositions herein mentioned are in a plastic state or condition that the same can be applied to walls or ceilings in the ordinary manner of plastering, and it will also be noticed that the coloring material and steatite can be incorporated with other fluid materials for coloring surfaces.

Having thus described my invention, what I claim as new, and desire to secure by Letters Patent, is—

1. Combining and intermixing crushed or powdered steatite with the various other ingredients employed for molding or forming blocks, tiles, pipes, figures, &c.

2. Combining and intermixing powdered steatite with coloring material, as and for the purpose set forth.

3. The combining of steatite cement and sand with or without gravel and coloring material, as and for the purpose set forth.

To the within specification I have signed my name this 11th day of November, 1871.

GEORGE H. MOORE.

Witnesses:
 JAMES L. NORRIS,
 WM. J. PEYTON.